United States Patent
Jung et al.

(10) Patent No.: US 10,219,011 B2
(45) Date of Patent: Feb. 26, 2019

(54) TERMINAL DEVICE AND INFORMATION PROVIDING METHOD THEREOF

(71) Applicant: SAMSUNG ELECTRONICS CO., LTD., Suwon-si (KR)

(72) Inventors: Tae-ung Jung, Suwon-si (KR); Yoon-hee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/925,100

(22) Filed: Oct. 28, 2015

(65) Prior Publication Data
US 2016/0127759 A1    May 5, 2016

(30) Foreign Application Priority Data
Nov. 5, 2014    (KR) .................. 10-2014-0152754

(51) Int. Cl.
| | |
|---|---|
| *H04H 60/32* | (2008.01) |
| *H04N 21/233* | (2011.01) |
| *H04N 21/239* | (2011.01) |
| *G06F 17/30* | (2006.01) |
| *H04N 21/44* | (2011.01) |
| *H04N 21/439* | (2011.01) |

(Continued)

(52) U.S. Cl.
CPC ..... *H04N 21/233* (2013.01); *G06F 17/30787* (2013.01); *H04N 21/2393* (2013.01); *H04N 21/23418* (2013.01); *H04N 21/4394* (2013.01); *H04N 21/44008* (2013.01); *H04N 21/6581* (2013.01); *H04N 21/812* (2013.01); *H04N 21/8133* (2013.01); *H04N 21/4126* (2013.01)

(58) Field of Classification Search
CPC ........... H04N 21/233; H04N 21/23418; H04N 21/2393; H04N 21/4394; H04N 21/44008
USPC ................................................ 725/19, 44, 34
See application file for complete search history.

(56) References Cited

U.S. PATENT DOCUMENTS

| | | | |
|---|---|---|---|
| 7,574,451 B2 | 8/2009 | Burges et al. | |
| 8,554,021 B2 | 10/2013 | Kletter | |

(Continued)

FOREIGN PATENT DOCUMENTS

| | | |
|---|---|---|
| CN | 100507911 C | 7/2009 |
| EP | 2444921 A2 | 4/2012 |

(Continued)

OTHER PUBLICATIONS

Communication dated Feb. 24, 2018, issued by the State Intellectual Property Office of People's Republic of China in counterpart Chinese Application No. 201510740635.X.

(Continued)

*Primary Examiner* — Jivka A Rabovianski
(74) *Attorney, Agent, or Firm* — Sughrue Mion, PLLC

(57) ABSTRACT

Provided herein is a terminal device including a communication interface configured to receive a moving picture; a fingerprint extractor configured to extract a fingerprint from a frame of the moving picture; a controller configured to detect a target object from the frame, and control the communication interface to transmit the fingerprint to a server, and receive object information corresponding to the transmitted fingerprint from the server; and an outputter configured to output the received object information when content corresponding to the object information is output.

8 Claims, 14 Drawing Sheets

(51) Int. Cl.
*H04N 21/81* (2011.01)
*H04N 21/234* (2011.01)
*H04N 21/658* (2011.01)
*H04N 21/41* (2011.01)

(56) References Cited

U.S. PATENT DOCUMENTS

| | | | |
|---|---|---|---|
| 2005/0066352 A1* | 3/2005 | Herley | H04N 7/16 |
| | | | 725/19 |
| 2006/0106867 A1 | 5/2006 | Burges et al. | |
| 2009/0154806 A1* | 6/2009 | Chang | G06F 17/30781 |
| | | | 382/173 |
| 2012/0017239 A1 | 1/2012 | Ryu et al. | |
| 2013/0247085 A1* | 9/2013 | Lee | G11B 27/034 |
| | | | 725/19 |
| 2014/0115627 A1* | 4/2014 | Lee | H04N 21/812 |
| | | | 725/34 |

FOREIGN PATENT DOCUMENTS

| | | |
|---|---|---|
| JP | 2004-343352 A | 12/2004 |
| JP | 4967998 B2 | 7/2012 |
| KR | 10-2010-0113020 A | 10/2010 |
| KR | 10-2012-0001104 A | 1/2012 |
| KR | 10-1108584 B1 | 1/2012 |
| KR | 10-1181732 B1 | 9/2012 |

OTHER PUBLICATIONS

Communication dated Nov. 2, 2018 issued by the State Intellectual Property Office of P.R. China in counterpart Chinese Application No. 201510740635.X.

* cited by examiner

TERMINAL DEVICE AND INFORMATION PROVIDING METHOD THEREOF

CROSS-REFERENCE TO RELATED APPLICATION

This application claims priority from Korean Patent Application No. 10-2014-0152754 filed in the Korean Intellectual Property Office on Nov. 5, 2014, the disclosure of which is incorporated herein in its entirety by reference.

BACKGROUND OF THE INVENTION

1. Field of the Invention

Methods and apparatuses consistent with exemplary embodiments relate to a terminal device and information providing method thereof, and more particularly, to a terminal device that is capable of reducing information processing load on the terminal device and on a server when providing contents-related information, and an information providing method thereof.

2. Description of the Prior Art

With the gradual increase of users' needs, the source of broadcasting contents and multimedia contents is changing from a skywave-oriented single source to various sources such as cables, Internet Protocol Televisions (IPTVs), and Videos On Demand (VODs). Furthermore, sources are emerging that provide information such as customized advertisements and program recommendations and the like.

Such information including customized advertisements and program recommendations needs to be provided such that it corresponds to an image that is being output through an outputting device. For example, it is effective that an advertisement message about a certain product is shown when an image where the product is exposed is being shown.

A related art apparatus used a fingerprint of an image, that is, feature data for identifying a content part currently being output in order to provide such an information providing service.

However, in the related art apparatus, the fingerprint had to be transmitted to a server on a very short cycle in order to recognize the content part currently being output. That is because, a meaningful object may appear and disappear on the content part currently being output while the fingerprint is not being transmitted, in which case the user may not receive the information on a timely basis.

However, the aforementioned related art method is problematic since it may place too much operational load on the apparatus that outputs contents and to the server. Furthermore, in the perspective of the network, too much traffic costs may incur.

SUMMARY OF THE INVENTION

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a terminal device capable of reducing operation load to a terminal device and to a server when providing contents-related information, and an information providing method thereof.

According to an aspect of an exemplary embodiment, there is provided a terminal device including: a communication interface configured to receive a moving picture; a fingerprint extractor configured to extract a fingerprint from a frame of the moving picture; a controller configured to detect a target object from the frame, and control, the communication interface to transmit the fingerprint to a server, and receive object information corresponding to the transmitted fingerprint from the server; and an outputter configured to output the received object information when content corresponding to the object information is output.

The controller may stop transmitting the fingerprint between a time when the fingerprint is transmitted to the server and a subsequent time when another object is detected.

The controller may control the communication interface to transmit a fingerprint of a frame from which an object is not detected to the server at a predetermined time interval.

The controller may control the communication interface to transmit the fingerprint of the frame from which the object is detected to the server regardless of the predetermined time interval.

The object information may include at least one of biography information, music information, advertisement information, broadcast program information, and item information.

The controller may control the communication interface to transmit the received object information to an external device.

The controller may control the fingerprint extractor to perform fingerprint extraction only for the frame from which the object was detected.

The fingerprint may be an identifier extracted from the frame which enables the frame to be distinguished from other frames, and wherein the frame corresponds to at least one of a video frame and an audio frame.

According to another aspect of an exemplary embodiment, there is provided an information providing system including: a terminal device configured to extract a fingerprint from a frame of a moving picture, detecting a target object from the frame, and transmit a fingerprint of the frame to a server in response to the target being detected; and the server configured to transmit object information corresponding to the fingerprint to the terminal device.

The server may include a communication interface configured to receive a moving picture; a fingerprint extractor configured to extract a fingerprint of the received moving picture; a controller configured to detect a target object from the frame that forms the moving picture, control the communication interface to transmit feature data of the detected target object to an object recognition server, and receive object information corresponding to the feature data from the object recognition server; and a storage configured to map the received object information to the fingerprint and the store a result of the mapping.

According to another aspect of an exemplary embodiment, there is provided an information providing method of a terminal device including: extracting a fingerprint from a frame a moving picture; detecting a target object from the frame, transmitting the extracted fingerprint of the frame to a server in response to the target object being detected; receiving object information corresponding to the fingerprint from the server; and outputting the received object information when content corresponding to the object information is output.

The transmitting the fingerprint may be stopped between a time when the fingerprint is transmitted to the server and a subsequent time when another target object is detected.

The transmitting may comprises transmitting a fingerprint of a frame from which an object is not detected to the server at a predetermined time interval.

The transmitting may further comprises transmitting the fingerprint of the frame from which the object is detected to the server regardless of the predetermined time interval.

The object information may include at least one of biography information, music information, broadcast program information, and item information.

The method may further include transmitting the received object information to an external device.

The extracting the fingerprint may be performed only for the frame from which the object is detected.

The fingerprint may be an identifier extracted from the frame which enables the frame to be distinguished from other frames, and wherein the frame corresponds to at least one of a vide frame and an audio frame.

According to another aspect of an exemplary embodiment, there is provided a non-transitory computer-readable record medium including a program for executing an information providing method of a terminal device. The method may include: extracting a fingerprint from a frame that forms a moving picture; detecting a target object from the frame; transmitting the extracted fingerprint to a server in response to the target object being detected; receiving object information corresponding to the transmitted fingerprint from the server; and outputting the received object information when content corresponding to the object information is output.

According to another aspect of an exemplary embodiment, there is provided an information providing method of a terminal device, the method including: recognizing a first object from a first frame of a video; transmitting a fingerprint of the first frame to a server to receive information about the first object; recognizing a second object from a second frame of the video; determining whether the second object is identical to the first object; and transmitting a fingerprint of the second frame to the server in response to a determination that the second object is not identical to the first object.

The determining may include determining whether a degree of similarity of the first object and the second object is greater than a predetermined level.

The second object may be determined as being identical to the first object when the second object has substantially the same appearance as the first object and a location value of the second object in the second frame is different from a location value of the first object in the first frame.

The method may further include: receiving the information about the first object from the server in response to the fingerprint of the first frame being transmitted to the server; determining that the second object is identical to the first object; and displaying the received information about the first object when the second object is displayed without transmitting a fingerprint of the second frame to the server.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
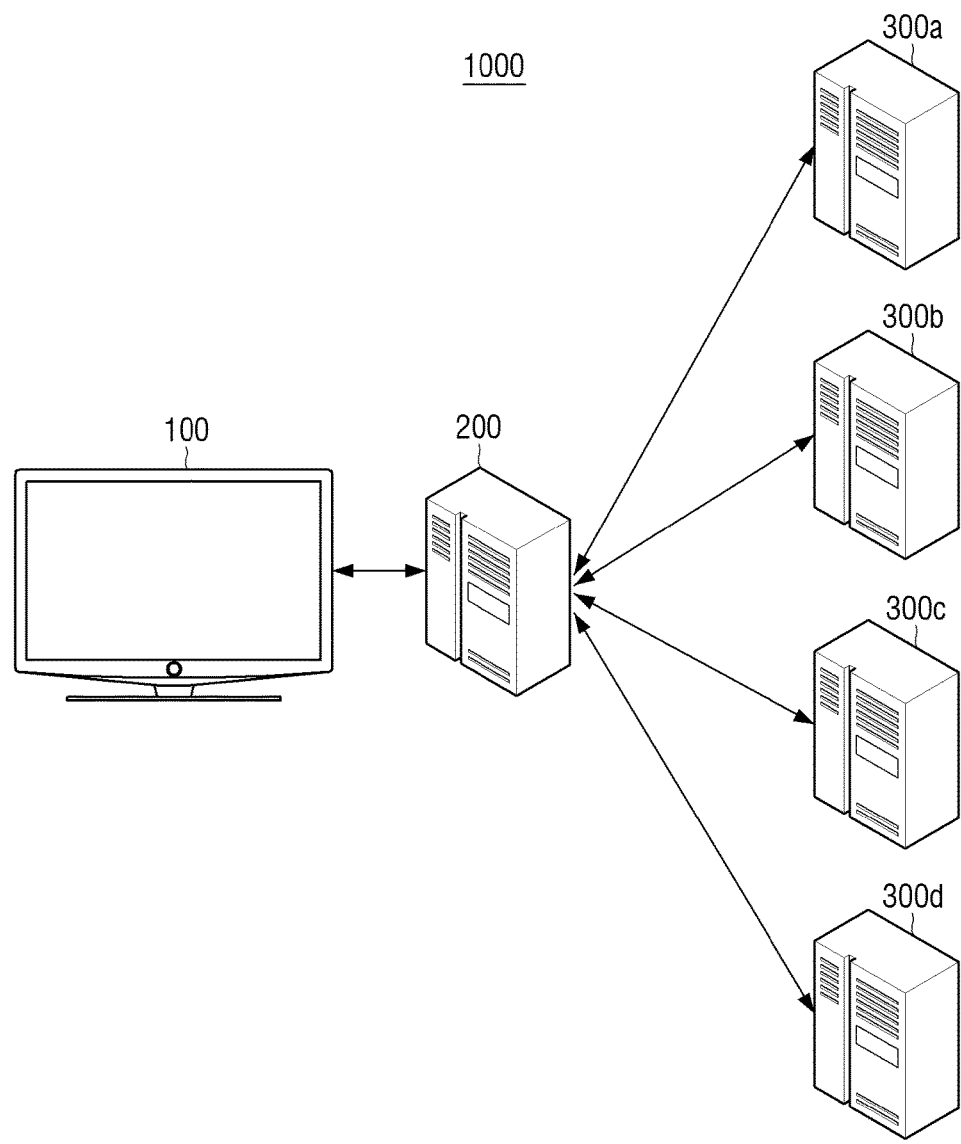
FIG. 1 is a view for explaining an information providing system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

A 'module' or 'unit' performs at least one function or operation, and may be realized as hardware or software, or a combination thereof. Furthermore, a plurality of 'modules' or a plurality of 'units' may be integrated into at least one module and be realized as at least one processor (not illustrated) except for when they need to be realized as a certain hardware.

FIG. 1 is a view for explaining an information providing system according to an exemplary embodiment.

Referring to FIG. 1, the information providing system 100 includes a terminal device 100, a server 200, and a plurality of object recognition servers 300*a*, 300*b*, 300*c*, and 300*d*.

The terminal device 100 is configured as a device that may provide information of an object included in an image. Specifically, the terminal device 100 is configured as a device that may request the server 200 to provide information of the object, and receive the requested object information from the server 200 and provide the received object information to the user. For example, the terminal device 100 may be a display apparatus (for example, TV, smart phone, PC, notebook, tablet, E-book, digital photo frame, PDA and the like), or a contents processing apparatus (for example, set top box) connected to a display apparatus.

The terminal device 100 may not have information about content currently being output from the terminal device 100 and a property of an object included in the content. Therefore, the terminal device 100 may transmit a fingerprint (i.e., data for identifying the content currently being output) to the server 200, and obtain information on the content currently being output and information on the object included in that content from the server 200. The server 200 maps basic information on the content or object information to the fingerprint and stores the same, and thus the server 200 may transmit the basic content information and/or object information corresponding to the fingerprint being transmitted from the terminal device 100 to the terminal device 100. The fingerprint will be explained in more detail later on.

Here, the term "content" may be used to describe various types of contents such as an image, sound, photograph and the like. A content consists of an audio signal and/or video signal. The audio signal that forms the content may be divided by a certain time unit called frame and may be processed, and a video signal that forms a content may also be divided by a certain unit of a picture and may be processed. Therefore, in one frame, an audio signal and/or video signal regarding a certain content part are included.

Herein, an object is an object included in an image or audio inside a frame that forms the content.

Herein, information of an object is one of various information related to the object, and the object information includes at least one of biography information, music information, advertisement information, broadcast program information, and item information. For example, if the object is a person, the object information may be information on the person's filmography, or information on other broadcast programs where the person appeared. In another example, if the object is an item, the object information may be information on a place where the item may be purchased, or information on a uniform resource locator (URL) address of an open market where the item is sold. In another example, if the object is a music, the object information may be information on the composer of the music, information on the play time of the music, or information on the URL address where the music can be downloaded.

The server 200 is configured as a device that stores the object information and that transmits the stored object information to the terminal device 100. Specifically, the server 200 may recognize a content part (frame) currently being output from the terminal device 100, and transmit to the terminal device 100 information about the object (object information) which is included in that content part. Furthermore, the server 200 may transmit not only the object information, but also basic information on the content to the terminal device 100. A frame may refer to one of a plurality of still images which compose a complete moving picture, or audio information provided during a particular time frame. A frame may also refer to content containing both video and audio information at a particular time frame.

Specifically, the server 200 transmits feature data of the object included in the frame to one of the plurality of object recognition servers 300*a*, 300*b*, 300*c*, and 300*d*, and receives the object information corresponding to that feature data from the object recognition server and stores the same. Herein, the feature data of the object may be an image corresponding to an object area detected from an image inside the frame, or a pulse-code modulation (PCM) data of a music detected from the audio inside the frame.

The plurality of object recognition servers 300*a*, 300*b*, 300*c*, and 300*d* are configured as a device that recognizes the object included in the information transmitted from an external device, and that provides information on the recognized object. The plurality of object recognition servers 300*a*, 300*b*, 300*c*, and 300*d* may include at least one of for example, a person recognition server, audio recognition server, advertisement recognition server, broadcast program recognition server, and item recognition server. Specifically, the plurality of object recognition servers 300*a*, 300*b*, 300*c*, and 300*d* search for the object information, using the feature data of the object received from the server 200 and transmit a search result to the server 200.

Meanwhile, hereinabove, it was explained that there are a plurality of object recognition servers, and that they are classified according to the type of the object to be recognized, but there is no limitation, and thus the object recognition server may be configured as one server.

Furthermore, hereinabove, it was explained that the server 200 and the plurality of object recognition servers 300*a*, 300*b*, 300*c*, and 300*d* are separated from each other, but they may be configured as one server where all their functions are integrated.

Hereinafter, each device included in the aforementioned information providing system 1000 will be explained in more detail.

Figure 2:
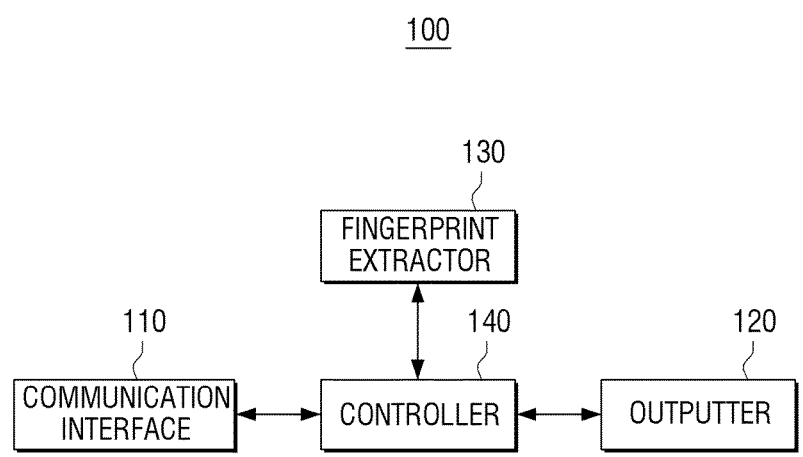
FIG. 2 is a block diagram for explaining a terminal device according to an exemplary embodiment.

FIG. 2 is a block diagram for explaining the terminal device 100 according to an exemplary embodiment.

Referring to FIG. 2, the terminal device 100 may include a communication interface 110, an outputter 120, a fingerprint extractor 130, and a controller 140.

The terminal device 100 may be a display apparatus (for example, TV, smart phone, PC, notebook, tablet, e-book, digital photo frame, and PDA), or a content processing apparatus (for example, set top box) connected to a display apparatus. The terminal device 100 may receive various types of signals and output a content. For example, the terminal device 100 is a device that may receive a broadcast signal and output the same. The terminal device 100 may receive various types of broadcast signals such as a ground wave broadcast signal, cable broadcast signal, satellite broadcast signal, and internet broadcast signal, and the like.

The communication interface 110 is a component configured to receive various data by communicating with an external device. The communication interface 110 is formed to connect the terminal device 100 to the external device, and the communication interface 110 may be connected to the external device through not only a LAN (Local Area Network) and internet, but also through a wireless communication method (for example, Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, and WiBRO). The communication interface 110 may receive a content from the external device, the content being in the form of one of various signals as aforementioned.

Especially, the communication interface 110 may transmit a fingerprint to the server 200 according to a control by the controller 140, and may receive object information matching the transmitted fingerprint from the server 200.

The outputter 120 is a component configured to display an image or output a sound according to a video or audio signal forming a content. For example, the outputter 120 may be realized as a monitor, screen, speaker, or beam projector and the like.

Especially, the outputter 120 may output the object information received from the server 200 at a timing when the content part matching the fingerprint transmitted to the server 200 is output.

Meanwhile, in a case where the terminal device 100 is realized as a device (for example, set top box) that converts a signal coming in from outside and displays its content on the display apparatus, the terminal device 100 may not include an outputter 120. In such a case, the terminal device 100 may transmit data for outputting the content through a port connected to the display apparatus.

The fingerprint extractor 130 refers to a processor inside the terminal device 100 that may extract a fingerprint from a frame that forms the content.

A fingerprint is unique data that identifies one frame from another frame. The fingerprint is feature data extracted from a video, image or audio signal included in the frame, and unlike meta data that is based on text, the fingerprint reflects unique characteristics of the signal itself. Therefore, a fingerprint is often called fingerprint data, DNA data or gene data. For example, in a case of an audio signal, the fingerprint is data that describes characteristics of the audio signal such as the frequency and amplitude of the audio signal, and in a case of an image or video signal, the fingerprint is a data that describes characteristics of the image or video signal such as the motion vector and color of the image or video signal. The fingerprint may be extracted by one of various related art algorithms. For example, an audio signal may be divided by a certain time interval, and signal sizes of the frequencies included in each time interval may be calculated. Furthermore, a size difference between signals of adjacent frequency sections may be obtained to calculate a frequency slope, and a fingerprint data may be quantized in 1 if the frequency slope is a positive number and in 0 if the frequency slope is a negative number.

Specifically, the fingerprint extractor 130 captures a frame at every predetermined interval while a content is being output and extracts a fingerprint. Meanwhile, according to an exemplary embodiment, the fingerprint extractor 130 may, instead of extracting a fingerprint from every frame of the predetermined interval, extract a fingerprint from only a frame where a target object is detected. According to this exemplary embodiment, the processing time for extracting a fingerprint may be reduced.

The controller 140 is a component configured to control overall operations of the terminal device 100. Specifically, the controller 140 controls the overall operations of the terminal device 100 using various programs stored in a storage. For example, the controller 140 may include a central processing unit (CPU), a random-access memeory (RAM), a read-only memory (ROM) and a system bus. Herein, the ROM is a component where a command set for booting the system is stored, and the CPU is a component that copies an operating system stored in the storage 110 to the RAM according to the command stored in the ROM and executes the O/S to boot the system. When a booting is completed, the CPU may copy various programs stored in the storage to the RAM, and execute the various programs to perform various operations. Hereinabove, it was explained that the controller 140 includes only one CPU, but it may be configured to include a plurality of CPUs (or a digital signal processor (DSP), a system on a chip (SoC)).

Meanwhile, hereinabove, it was explained that the fingerprint extractor 130 and the controller 140 are separate components, but they may be included in the terminal device 100 as one processor.

The storage of the terminal device 100 is a component for storing various programs and data necessary for driving the terminal device 100. The storage may be realized as a nonvolatile memory, volatile memory, flash-memory, hard disk drive (HDD), or solid state drive (SSD). The storage is accessed by the controller 140, and reading/recording/modifying/deleting/updating a data may be performed by the controller 140. In the present disclosure, the term, storage, may be a storage, ROM inside the controller 140, RAM, or a memory card mounted on the terminal device 100 (for example, micro SD card or memory stick).

Especially, the controller 140 may detect an object from a frame that forms a content. Examples of an object that may be detected include a person, item, background, and building included in an image inside the frame, and further, a music, voice and melody included in an audio inside the frame may be detected. An example of detecting an object will be explained with reference to FIG. 3.

Figure 3A:
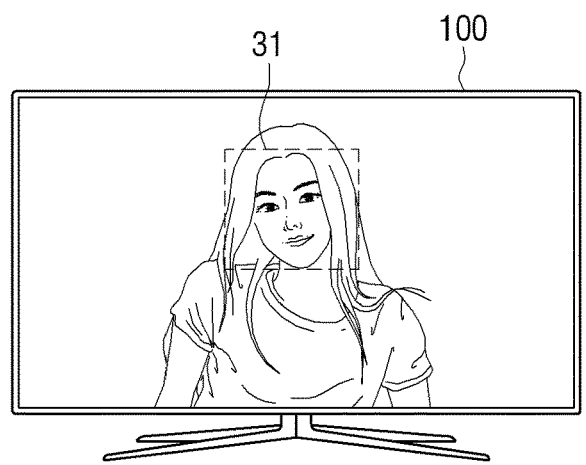
FIGS. 3A and 3B illustrate an object detection method according to an exemplary embodiment.
Figure 3B:
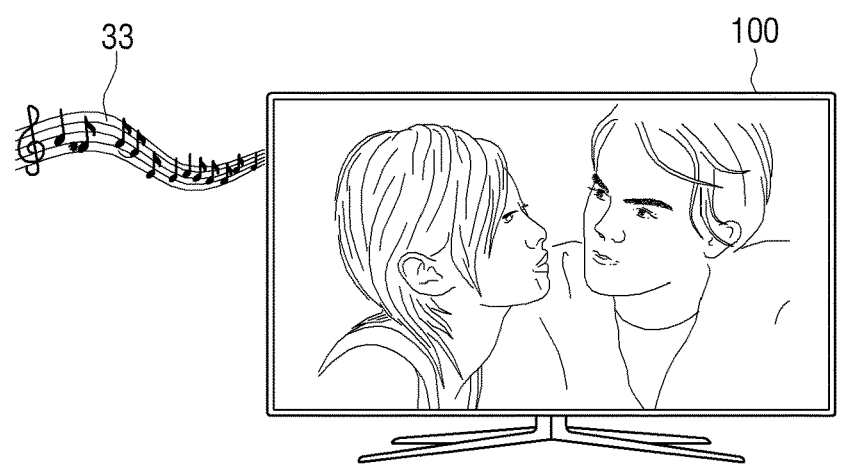

FIGS. 3A and 3B illustrate an object detecting method performed in the terminal device according to an exemplary embodiment.

Referring to FIG. 3A, the controller 140 may detect a face 31 from an image at a certain time frame. For example, the controller 140 may detect the face 31 from the image using information about an edge and color of the image. The image may be referred to as a video frame, and may correspond to one of the still images which compose a complete moving picture.

Furthermore, referring to FIG. 3B, the controller 140 may detect a music 33 from an audio at the time frame. For example, the controller 140 may distinguish between voice and music using frequency and amplitude characteristics of the voice and the music which change over time, and may detect whether or not a target music is included in the audio inside the frame.

The terminal device 100 may perform the object detecting operation but omit to perform an object recognition process, which may be performed by an external server. Accordingly, there is an effect of reducing the overhead necessary for the object recognition in the terminal device 100.

Meanwhile, the aforementioned object detecting method is a mere example. Various related art algorithms for detecting an object may be used.

Furthermore, the controller 140 may control the communication interface 110 to transmit the fingerprint of the frame from which an object was detected to the server 200. Specifically, when a content part corresponding to the frame from which the object was detected is being output through the outputter 120, or when the content part exists in a buffer before being output, the controller 140 may transmit the fingerprint of the frame that forms that content part to the server 200.

In other words, the controller 140 may transmit the fingerprint to the server 200 every time the fingerprint is being extracted, but it may transmit the fingerprint only when an object is detected and request information of the object. Therefore, the cost necessary for a query from the terminal device 100 to the server 200 may be minimized, and the traffic cost between the terminal device 100 and the server 200 may be minimized as well.

Meanwhile, according to another exemplary embodiment, the controller 140 may control the communication interface 110 to transmit to the server 200 a fingerprint of a frame from which a target object is not detected at a predetermined time interval. That is, while the target object is not detected, the terminal device 100 may transmit the fingerprint to the server 200 only at the predetermined interval, and receive basic information of the content. This exemplary embodiment will be explained hereinafter with reference to FIG. 4.

Figure 4:
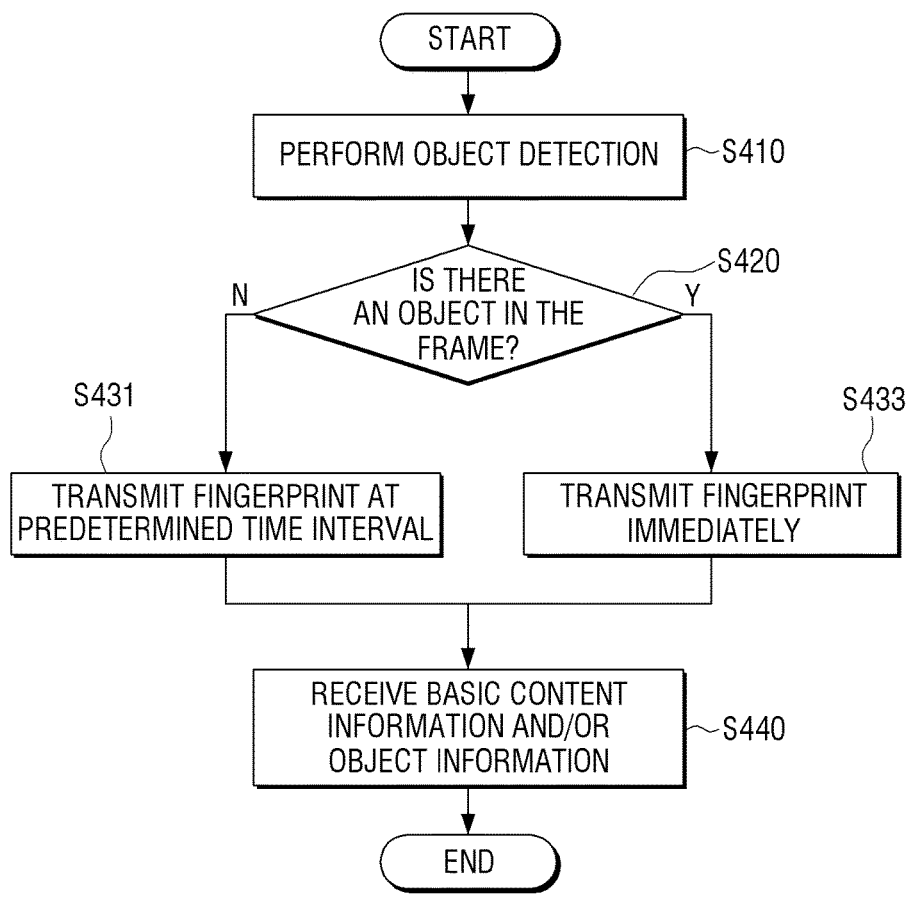
FIG. 4 is a flowchart for explaining a fingerprint transmission method of a terminal device according to an exemplary embodiment.

FIG. 4 is a flowchart for explaining a fingerprint transmitting method of the terminal device 100 according to an exemplary embodiment.

Referring to FIG. 4, the controller 140 may perform an object detection (operation S410). While a content is being output, a fingerprint is being extracted by the fingerprint extractor 130 on a regular basis, and being stored in the storage.

Furthermore, the controller 140 may determine whether or not there exists a target object at a certain time frame that forms the content to be output (operation S420). In response to determining that the target object exists at the time frame (i.e., detecting an image and/or audio signal for the target object), the controller 140 may transmit the fingerprint extracted from the frame immediately to the server 200 (operation S433), and receive information about the target object from the server 200 (operation S440). Herein, the server 200 may transmit basic information about the content together with the object information.

On the other hand, in response to determining that an object is not detected from that frame, the controller 140 may transmit the fingerprint to the server 200 only at a predetermined time interval (e.g., 1 minute) while the object is not being detected (operation S431). That is because, since the main purpose is to receive information of a target object, there is no need to make a query frequently to the server 200 while there is no target object. In such a case, the server 200 may receive the fingerprint from the terminal device 100 and transmit basic content information that matches the fingerprint to the terminal device 100 (operation S440). Since a user normally does not change channels at a time interval of 1 minute considering general viewing patterns, when an object is not detected, there is no problem in identifying what content the terminal device 100 is currently viewing even if a query is made to the server 200 only at a time interval of about 1 minute.

Furthermore, the controller 140 may control the communication interface to transmit to the server 200 the fingerprint of the frame from which a target object is detected regardless of the predetermined time interval. That is, when the target object appears within the predetermined time interval of 1 minute and thus it is necessary to receive information of the object, a fingerprint will be transmitted immediately, and thus the terminal device 100 will not miss the object information.

Meanwhile, in the present disclosure, basic content information may refer to basic information about the content itself, for example, in a case where the content is a broadcast program, channel information, program title, and information on which point of the program the content part currently being output corresponds to, and in a case where the content is a media file, media file format, and information on which point of the media file the content part currently being output corresponds to. Such basic content information is information that can be known even if the server 200 does not make a query to another external device. The basic content information that the server 200 may identify as aforementioned will be explained in detail later on.

In the aforementioned exemplary embodiments, it was explained that a fingerprint is extracted by the fingerprint extractor 130 on a regular basis. However, according to another exemplary embodiment, the controller 140 may control the fingerprint extractor 130 to perform a fingerprint extraction only for a frame from which a target object is detected. According to this exemplary embodiment, in a case where the terminal device 100 obtains the object information mainly from the server 200, it is possible to effectively reduce the processing cost for extracting a fingerprint.

Figure 6:
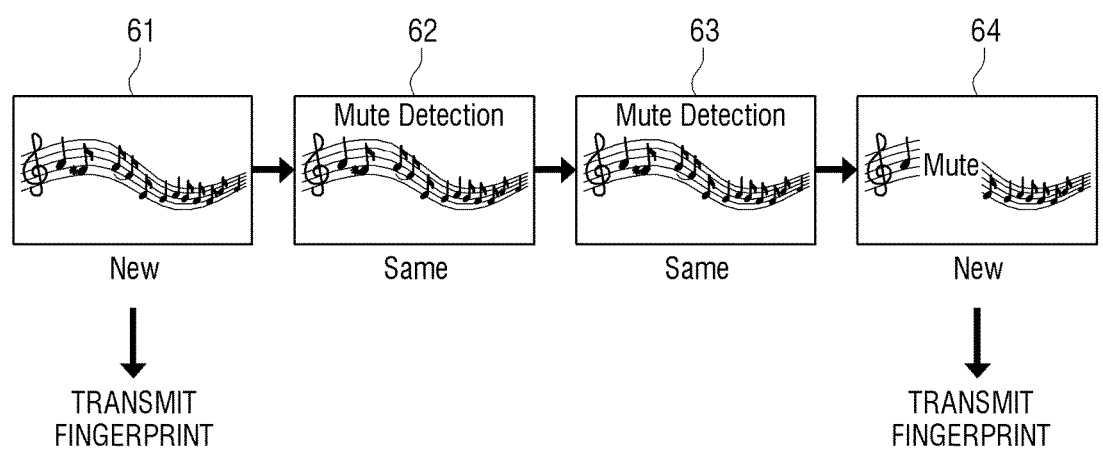
Figure 7:
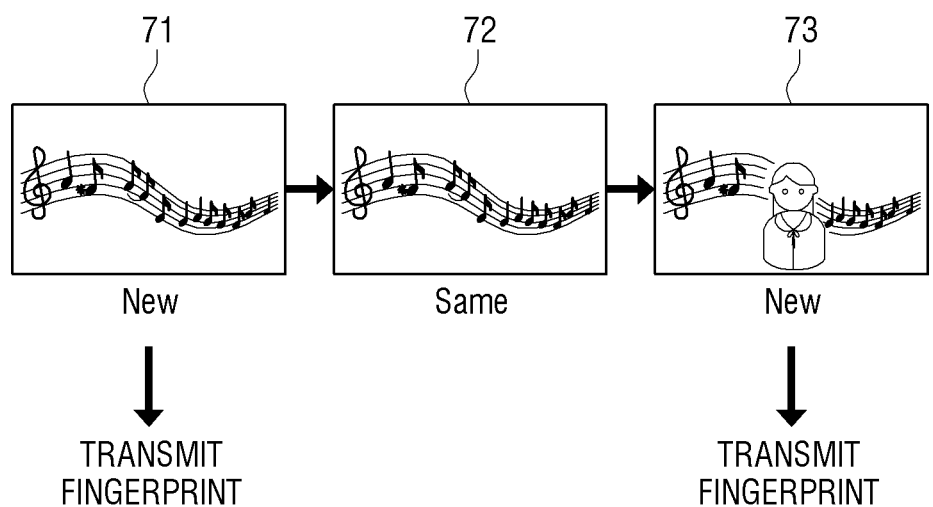

Hereinafter, a fingerprint transmitting method of the terminal device according to other exemplary embodiments will be explained with reference to FIGS. 5 to 7.

According to an exemplary embodiment, the controller 140 may stop transmitting a fingerprint between a time when a first object is detected and a fingerprint of the first object is transmitted to the server 200 and a subsequent time when a second object, which is different from the first object, is detected.

Figure 5:
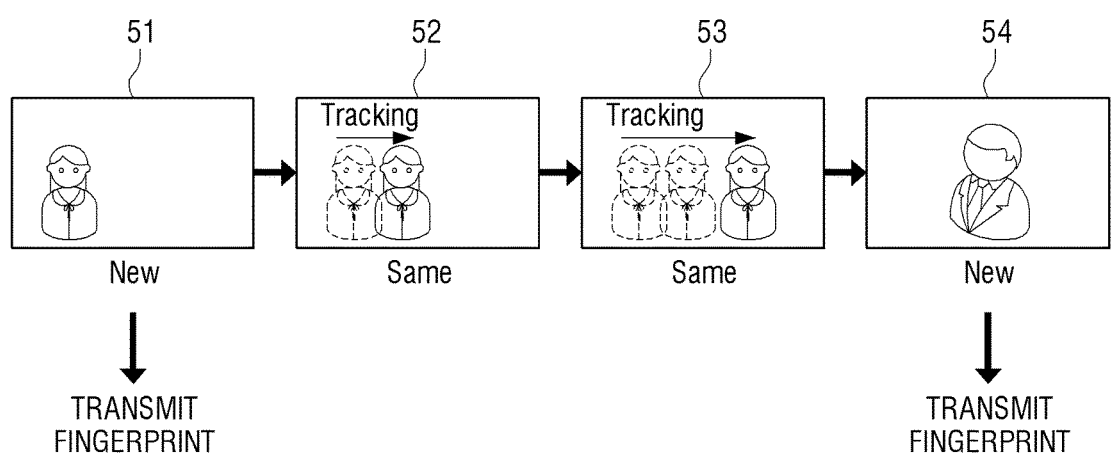
FIGS. 5 to 7 are views for explaining a fingerprint transmission method of a terminal device according to various exemplary embodiments.

For example, as illustrated in FIG. 5, since an object is detected from a first frame 51 and a fingerprint is transmitted until a new object is detected, the fingerprint is not transmitted even if the previously detected object is displayed or reproduced differently than the first frame 51 afterwards. That is, when a content part corresponding to a second frame 52 and a third frame 53 is being output, the fingerprint is not transmitted. This is because, there is no need to receive the object information repeatedly regarding a same object as before. When a new object is detected from the fourth frame 54, the controller 140 transmits a fingerprint extracted from the fourth frame to the server 200 to request object information regarding the new object.

Specifically, by performing an image tracking, the controller 140 may determine whether a same object as that existed in a previous frame is just changing its position on a screen or another new object appeared. Therefore, even when an object is repeatedly detected, the controller 140 may transmit the fingerprint to the server 200 only when a new object appears.

This exemplary embodiment may be applied in the same manner to music detection. Specifically, referring to FIG. 6, when a music is detected from a video at the first time frame 61, the controller 140 may transmit a fingerprint, and determines whether the music has ever stopped, and if it is determined that the music has never stopped, the controller 140 stops transmitting the fingerprint during the time when the music is continuously played. That is, since a same music as in the first frame 61 is being played at the second time frame 62 and the third time frame 63, the fingerprint is not transmitted. Furthermore, when is the controller 140 senses at the fourth time frame 64 that the music is stopped for a certain period and then played again, the controller 140 may extract a fingerprint of the music at the fourth time frame 64 and transmit it to the server 200.

Furthermore, this exemplary embodiment may also be applied to a case of another type of object being detected. Specifically, referring to FIG. 7, after the transmission of the fingerprint extracted at the first time frame 71 from which the music was detected, at a point where the second frame 72 from which a stop of music was not sensed, the fingerprint is not transmitted. Thereafter, at a point of the output of the third frame 73 from which a new type of object is detected, the controller 140 transmits the fingerprint. Herein, a new type of object means an image object that newly appeared in the third frame 73 that is a different type of music object detected from the first to second frame 71, 72.

In the aforementioned exemplary embodiment explained with reference to FIGS. 5 to 7, there is an advantage of reducing the cost for making a query compared to the exemplary embodiment where a fingerprint is transmitted every time an object is detected.

Furthermore, the controller 140 may control the communication interface 110 to receive from the server 200 object information matching the fingerprint transmitted to the server 200. In such a case, since not only the object information but also basic content information is matched to the fingerprint and stored in the server 200, the terminal device 100 may receive not only the object information but also the basic content information.

Furthermore, the controller 140 may control the outputter 120 to output the received object information. An example of outputting object information will be explained hereinafter with reference to FIG. 8.

Figure 8:
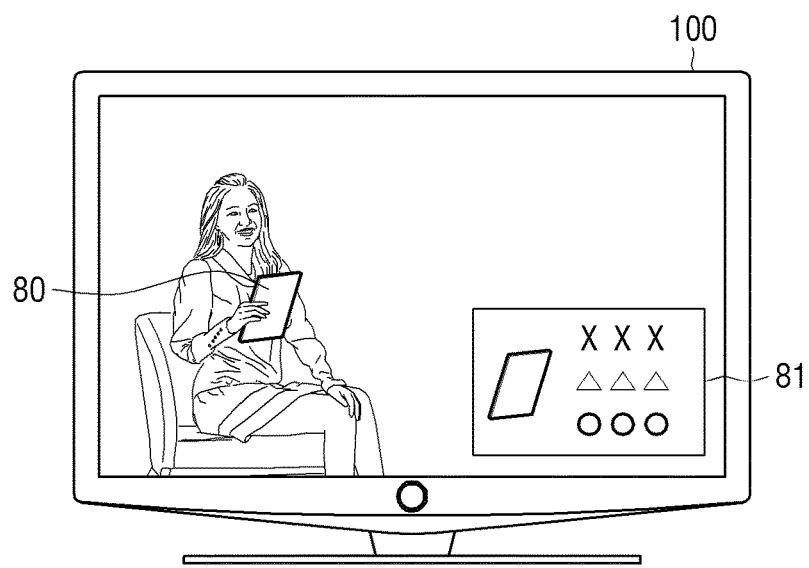
FIGS. 8 to 9 are views for explaining object information providing method of a terminal device according to various exemplary embodiments.

FIG. 8 is a view for explaining outputting object information in the terminal device according to an exemplary embodiment.

Referring to FIG. 8, the terminal device 100 is realized as a display apparatus having a display. In this case, the outputter 120 includes a display and a speaker.

The controller 140 may receive object information from the server 200, and display the object information on an object information output area 81. The object information being displayed on the object information output area 81 may be information on a product 80, that is the object recognized from the current frame. For example, the object information may be explanation on the recognized product 80, that is information on an URL address of an internet shopping mall where the product 80 is sold. Object information on a timing when the product 80 is displayed is displayed together, and thus the advertising effect of the product 80 may be maximized.

Meanwhile, according to an exemplary embodiment, object information may be output from a terminal device other than the terminal device 100. For this purpose, the controller 140 may control the communication interface 110 to transmit the object information received from the server 200 to an external device. This embodiment will be explained in more detail hereinafter with reference to FIG. 9.

Figure 9:
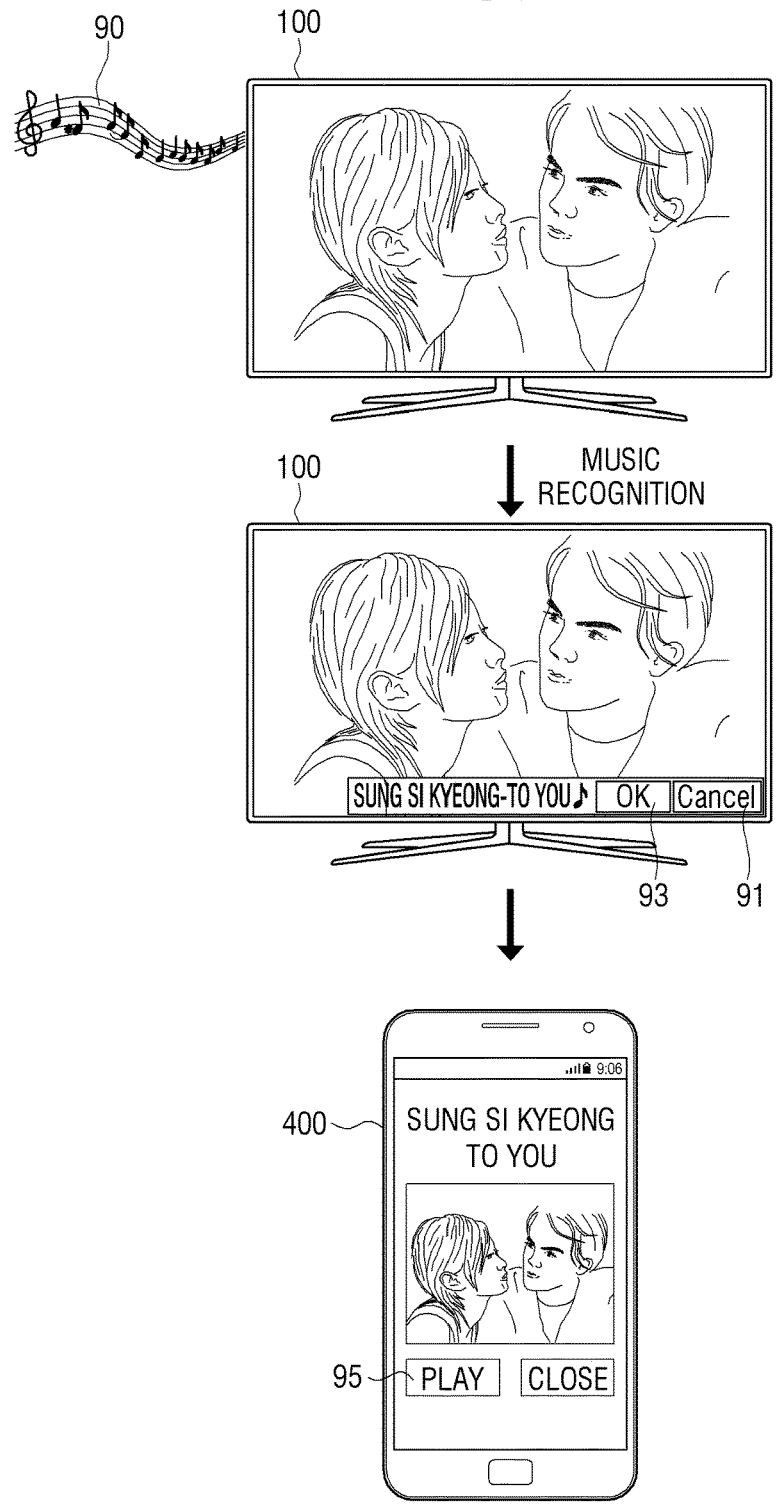

FIG. 9 is a view for explaining an information providing method of the terminal device according to another exemplary embodiment.

Referring to FIG. 9, when a music 90 is detected when a certain content part is being output from the terminal device 100, the controller 140 may transmit a fingerprint extracted from the frame corresponding to that content part to the server 200, and receives object information matching the transmitted fingerprint. The controller 140 may transmit the received object information to the external device 400. Specifically, the controller 140 may display a UI screen for receiving a user manipulation command for transmitting the object information to the external device 400, and when a user manipulation of selecting an OK button 93 is entered, the object information is transmitted to the external device 400. In FIG. 9, when the music object information has been transmitted to the server 400, and a play menu 95 for hearing the music is selected, the external device 400 may play the music using the received object information. Herein, the transmitted object information may be the URL address of a web page that provides streaming replay of the music. When a cancel button 95 is selected, the controller 140 may control the outputter 120 to stop displaying the UI screen.

According to this exemplary embodiment, the user may be provided with the object information in a device such as a mobile phone from which information may be read more easily, thereby further improving user convenience.

Hereinafter, the server 200 configured to communicate with the terminal device 100 will be explained in more detail with reference to FIGS. 10 to 12.

Figure 10:
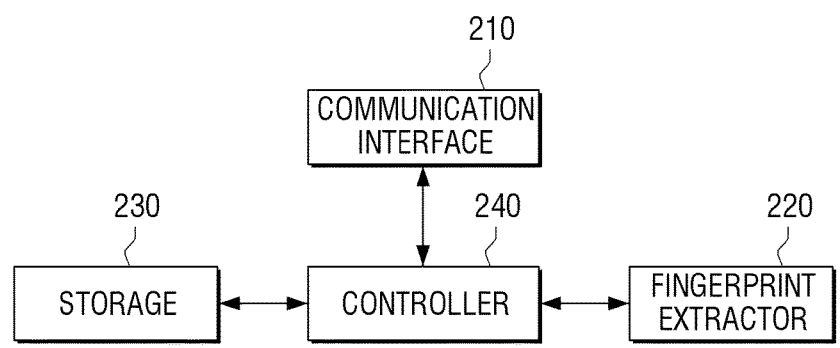
FIG. 10 is a block diagram for explaining a server according to an exemplary embodiment.

FIG. 10 is a block diagram for explaining the server 200 according to an exemplary embodiment. Referring to FIG. 10, the server 200 may include a communication interface 210, a fingerprint extractor 220, a storage 230 and a controller 240.

The communication interface 210 is a component configured to receive various data by communicating with an external device. The communication interface 210 is formed to connect the terminal device 100 to the external device, and the communication interface 210 may be connected to the external device through not only a LAN (Local Area Network) and internet, but also through a wireless communication method (for example, Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, and WiBRO).

Specifically, the communication interface 210 may receive a content, for example, a broadcast program. Broadcast programs include advertisements. In some cases, the communication interface 210 may receive EPG information related to a broadcast program. The EPG information may be received from a supplier of a broadcast program, or from a separate EPG supplier. In this case, the server 200 may receive the broadcast program and EPG information, and thus the server 200 may recognize a broadcast program information using the received broadcast program and electronic program guide (EPG) information.

Furthermore, the communication interface 210 may transmit object information or basic content information matching the fingerprint received from the terminal device 100 to the terminal device 100.

Furthermore, the communication interface 210 may transmit feature data of an object to an object recognition server, and receive object information corresponding to that feature data. Meanwhile, an object recognition server and server 200 according to another exemplary embodiment may be realized as one apparatus, and an object recognition operation may be performed inside the single server 200. In such a case, the feature data of the object is transmitted between components inside the server 200.

The fingerprint extractor 220 means a processor inside the server 200 that may extract a fingerprint from a frame that forms a object. The fingerprint was explained earlier on in the part about the terminal device 100 and thus specific explanation on overlapping configurations will be omitted.

Meanwhile, the fingerprint extractor 220 extracts a fingerprint from the content provided from an external content source and stores it in the storage 230. Therefore, a list of a plurality of fingerprints regarding a plurality of contents may be stored in the storage 230.

In such a case, basic content information may be matched to each fingerprint and be stored in the storage 230. For example, in a case where the content is a broadcast program, the controller 240 may match a channel information of the content to a fingerprint and store it in the storage 230. Furthermore, information on the program currently being aired in that channel may be identified with reference to the EPG. That is, in the storage 230, basic information on the content itself that may be known even if a request is not made to an external device may be matched with a fingerprint and be stored.

The storage 230 is a component for storing various programs and data necessary for driving the server 200. The storage 230 may be realized as a nonvolatile memory, volatile memory, flash-memory, hard disk drive (HDD), or solid state drive (SSD). The storage 230 is accessed by the controller 240, and reading/recording/modifying/deleting/updating a data may be performed by the controller 240. In the present disclosure, the term, storage, may be a storage 230, ROM inside the controller 240, RAM, or a memory card mounted on the server 200 (for example, micro SD card or memory stick).

Specifically, in the storage 230, a fingerprint, object information, and basic content information may be stored. The data stored in the storage 230 will be explained in detail hereinafter with reference to FIG. 11.

Figure 11:
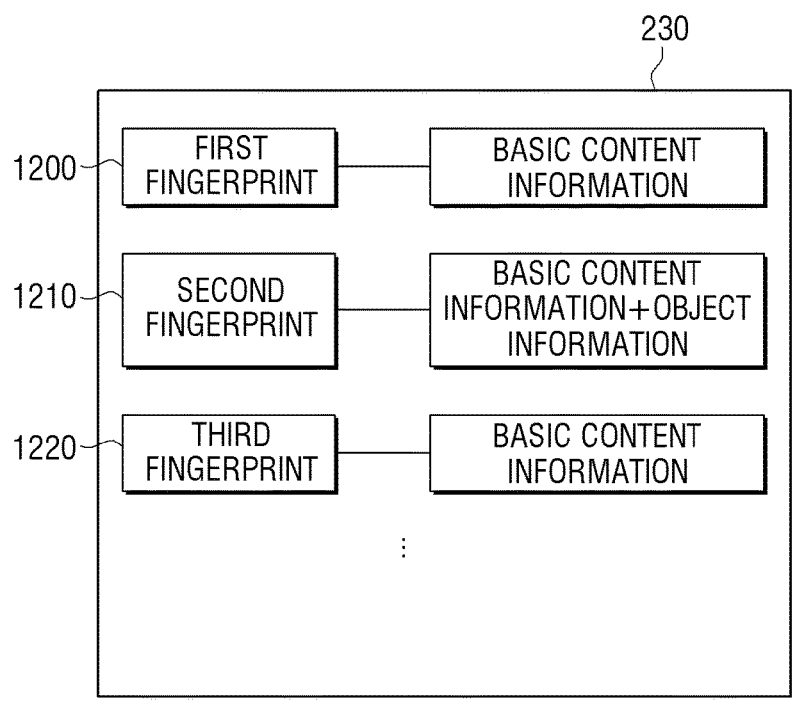
FIG. 11 is a view for explaining information stored in a server according to an exemplary embodiment.

FIG. 11 is a view for explaining data stored in the server 200 according to an exemplary embodiment.

In the storage 230, fingerprints extracted for each content, and various information matched to the fingerprints are stored. Referring to FIG. 11, the fingerprints extracted from a frame that forms a certain content, basic content information matched to the fingerprints, and object information are stored in the storage 230.

Herein, as aforementioned, basic content information refers to basic information on the content itself, for example, in a case where the content is a broadcast program, channel information, program title, and information on which point of the program the content part currently being output corresponds to, and in a case where the content is a media file, media file format, and information on which point of the media file the content part currently being output corresponds to. Therefore, as illustrated in FIG. 11, the controller 240 may match basic content information to all the first to third fingerprints 1200-1220, and store the same in the storage 230.

Meanwhile, in a case where an object is included in a frame, object information is matched to a fingerprint that matches the corresponding frame, and then stored in the storage 230. FIG. 11 illustrates an example where an object is not included in the frame that corresponds to the first and third fingerprints 1200, 1220, and an object is included only in the second fingerprint 1210. Therefore, herein, the object information is matched to the second fingerprint 1210 and is stored in the storage 230.

Object information is information that can be identified only when an object is recognized. For this purpose, the controller 240 transmits feature data of the object to an object recognition server, and receives object information, and then matches the object information to the fingerprint and stores the same in the storage 230.

The controller 240 is a component for controlling overall operations of the server 200. Specifically, the controller 240 controls the overall operations of the server 200 using various programs stored in the storage 230. For example, the controller 240 may include a CPU, RAM, ROM and system bus. Herein, the ROM is a component where a command set for booting the system is stored, and the CPU is a component that copies an operating system stored in the storage 230 to the RAM according to the command stored in the ROM and executes the O/S to boot the system. When a booting is completed, the CPU may copy various programs stored in the storage to the RAM, and execute the various programs to perform various operations. Hereinabove, it was explained that the controller 240 includes only one CPU, but it may be configured to include a plurality of CPUs (or DSP, SoC).

Meanwhile, hereinabove, it was explained that the fingerprint extractor 220 and the controller 240 are separate components, but they may be included in the server 200 as one processor.

Specifically, the controller 240 searches for fingerprints that match the fingerprint received from the terminal device 100 of the fingerprints stored in the storage 230. This will be explained hereinabove with reference to FIG. 12.

Figure 12:
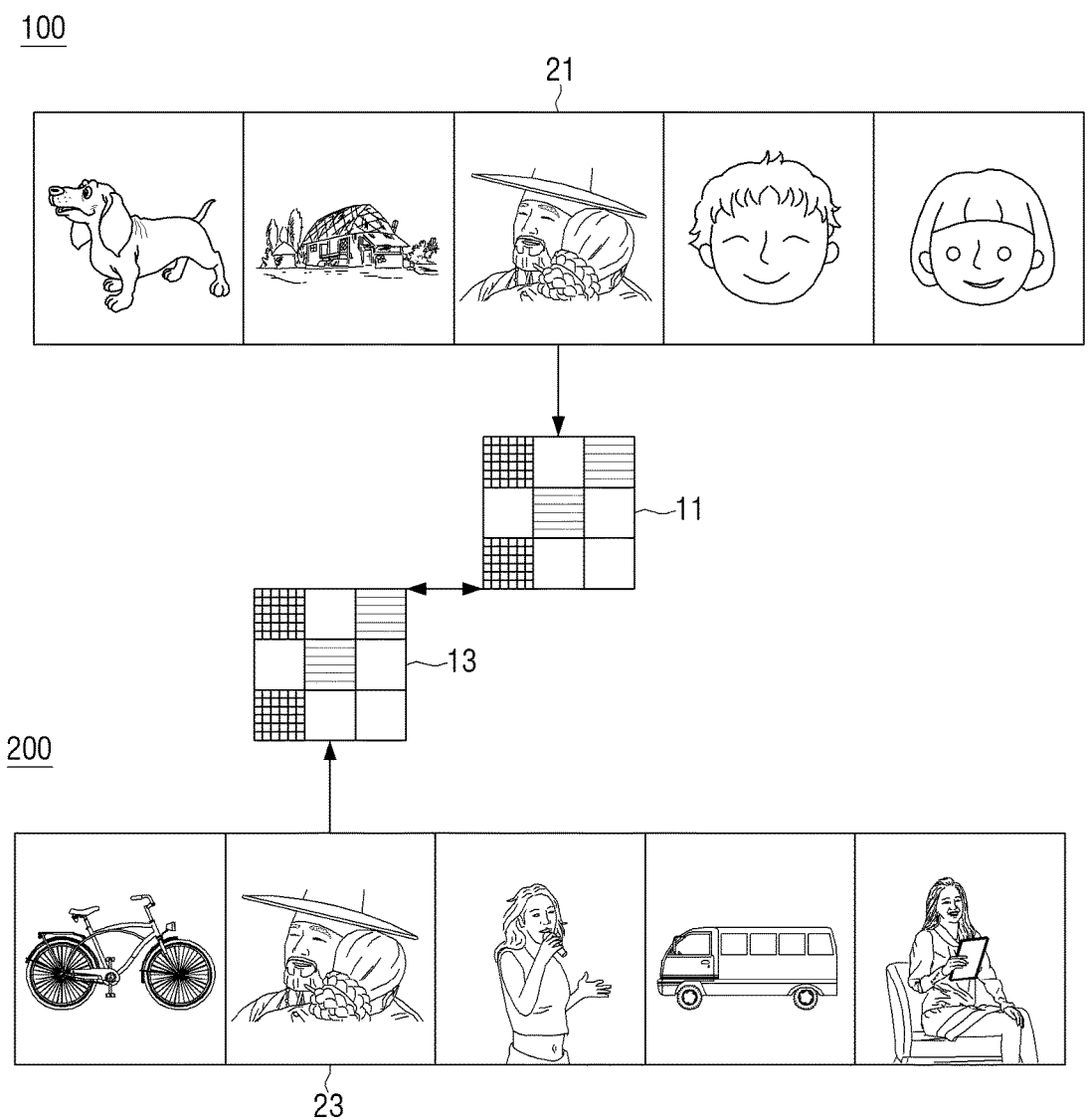
FIG. 12 is a view for explaining a fingerprint search method according to a server according to an exemplary embodiment.

FIG. 12 is a view for explaining searching for a fingerprint of the server 200 according to an exemplary embodiment.

Referring to FIG. 12, when a certain fingerprint 11 is transmitted from the terminal device 100, the controller 240 searches for a fingerprint 13 that matches the received fingerprint 11. In the storage, basic content information matched to the fingerprint 13 is stored, and the controller 240 transmits the basic content information matched to the fingerprint 13 to the terminal device 100. Accordingly, the terminal device 100 may recognize which part of which content the frame 21 currently being output corresponds to, and may provide the basic content information to the user through the outputter 120. Furthermore, when the object information matched to the fingerprint 13 is stored in the storage 230, the controller 240 transmits the object information matched to the fingerprint 13 to the terminal device 100. Accordingly, the terminal device 100 may recognize which object is included in the frame 21 that is currently being output, and may provide the received object information to the user through the outputter 120.

Furthermore, the controller 240 may detect an object from the frame that forms the received content. The object detecting method was explained in the part about the terminal device 100 and thus repeated explanation will be omitted.

Furthermore, the controller 240 controls the communication interface 210 to transmit feature data of the object included in the frame from which the object is detected to the object recognition server. That is, instead of transmitting feature data of all frames, the controller transmits only the feature data of the object included in the frame from which the object is detected to the object recognition server, and requests for object recognition.

Therefore, the network traffic load between the server 200 and the object recognition server may be reduced for object recognition, and the cost for data transmission may also be saved. This is similar to the effect where the fingerprint is transmitted only when an object is recognized in the terminal device 100.

Herein, in the case of an object included in an image, feature data of the object may be data of an image of an area where the object is included. Furthermore, in the case of an object included in a video at a certain time frame, feature data of the object may be PCM data (analogue data converted to binary signal data).

The object recognition server that received such feature data of an object searches for object information that matches the received feature data of the object information pre-stored. For example, for audio recognition, an audio data of one or two phrases may be used as feature data of an object. For recognition of an item, animal, or place, each image may be used as the feature data of the object, and for recognition of a broadcast program and advertisement, a fingerprint extracted from a frame may be used as feature data of an object.

Object recognition is performed in a similar manner when a plurality of objects are included in one frame. For example, when a person, item, or music is included, the server 200 extracts from one frame feature data of an object regarding a person, feature data of an object regarding an item, and feature data of an object regarding a music. Furthermore, the server 200 extracts a fingerprint. Each extracted feature data of the object is transmitted to a person recognition server, item recognition server, audio recognition server, and broadcast program recognition server. Each object recognition server searches for object information using the received feature data of the object, and transmits a result of the search to the server 200. The server 200 maps the fingerprint extracted from the frame with the received biography information, item information, music information, and broadcast program information into one and stores the same.

The server 200 and the object recognition server may be realized as one apparatus, or as separate apparatuses. When the server 200 and the object recognition server are realized as one apparatus, transmission of the feature data of the object and the object information will be made internally, and thus the transmission speed will be faster than when it should be made through an external net. Furthermore, information transmission is possible by an internal net or short distance communication without going through an external net even when the server 200 and object recognition server are realized as separate apparatuses, and thus costs may be reduced and the processing speed may be increased.

According to the aforementioned server 200 according to an exemplary embodiment, the server 200 extracts feature data of an object from a frame and performs object recognition only when the object is detected, and thus the load and transmission traffic of the server 200 may be reduced.

Hereinafter, an information providing method of a terminal device 100 according to an exemplary embodiment will be explained with reference to FIG. 13.

Figure 13:
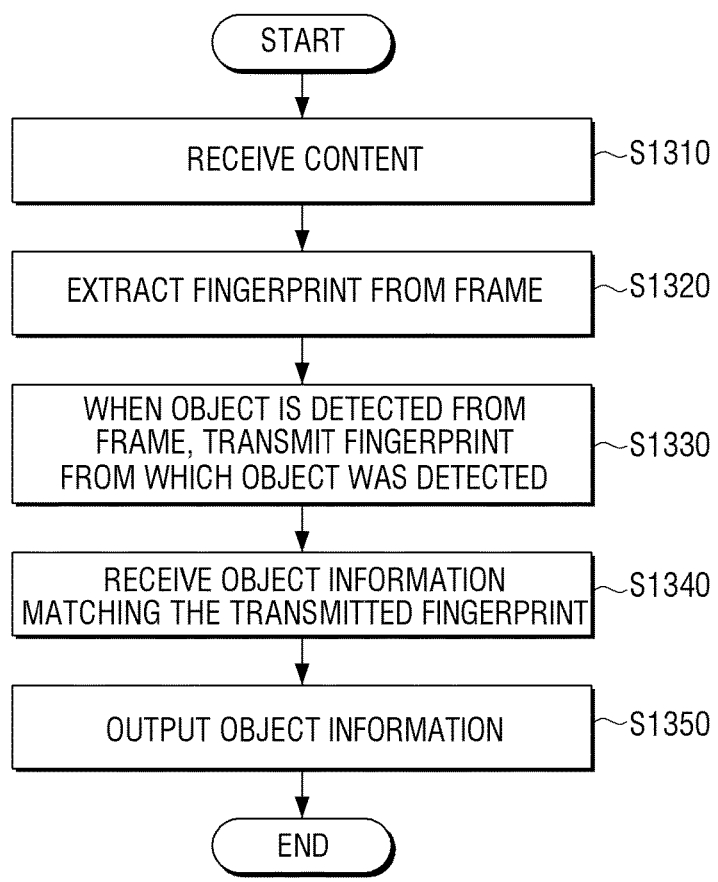
FIG. 13 is a flowchart for explaining an information providing method of a terminal apparatus according to an exemplary embodiment.

Referring to FIG. 13, the terminal device 100 receives a content (operation S1310). According to another exemplary embodiment, the content may be pre-stored in a storage of the terminal device 100 so that the terminal device 100 does not have to receive the content from an external device.

Furthermore, the terminal device 100 may extract a fingerprint from a frame that forms the content (operation S1320). Extracting the fingerprint may be performed together with outputting of the content in real time. Specifically, the fingerprint of the content part may be extracted right before each content part is output.

Furthermore, when an object is detected from the frame that forms the content, the fingerprint of the frame from which the object is detected may be transmitted to the server 200 (operation S1330). If an object is not detected from the frame that forms the content, the fingerprint of that frame may be selectively transmitted to the server 200. For example, the fingerprint of the frame from which an object is detected may be transmitted to the server 200 only at a predetermined time interval. For example, in a case where the predetermined time interval is 1 minute, the fingerprint may not be transmitted after the first fingerprint of the frame from which an object is not detected is transmitted to the server 200, and when 1 minute passes, the fingerprint may be transmitted to the server 200. Of course, if an object is detected during that time, the fingerprint of the frame from which that object is detected is transmitted directly to the server 200 without having to wait for the 1 minute to pass.

Then, the terminal device 100 may receive object information that matches the transmitted fingerprint from the server 200 (operation S1340). In a case where there is no object information that matches the fingerprint, the terminal device 100 may receive only basic information of the content that matches the fingerprint.

Furthermore, the terminal device 100 may output the received object information when the content part matching the transmitted fingerprint is output (operation S1350). In such a case, the terminal device 100 may output the object information at one side of a screen displayed on the display, that is, the outputter 120. Specifically, the position for the object information to be displayed and the display method may be determined by a user setting. For example, if the user does not want to be interrupted from watching a content, the user may change the user setting not to display object information, or to display only a small icon in order to move the object information. Furthermore, the terminal device 100 may transmit object information to another terminal device. In such a case, this another terminal device may be a smart phone, remote control, or wearable device (e.g., smart watch) and the like capable of outputting object information.

The aforementioned explanation on the present disclosure is applicable to the information providing method explained with reference to FIG. 13, and thus various information providing methods may be understood. Therefore, repeated explanation on the overlapping parts will be omitted.

In the aforementioned information providing method according to various exemplary embodiments, it is possible to reduce a transmission amount of the fingerprint being transmitted to provide object information and of feature data of the object, thereby reducing the load on the terminal device and the server.

Furthermore, the aforementioned information providing method according to various exemplary embodiments may be realized as a program that includes the information providing method executable in a computer, and this program may be stored in a non-transitory computer readable medium, and be provided as such. This non-transitory computer readable medium may be mounted on various apparatuses and be used.

A non-transitory computer readable medium refers to a medium that may store data semi-permanently and not for a short period of time such as a resistor, cache, and memory. Specifically, an application or program for performing the various methods mentioned above may be stored in a CD, DVD, hard disk, Blue-ray disk, USB, memory card, and ROM, and be provided.

Hereinafter, a configuration of a terminal device 100' according to another exemplary embodiment will be explained with reference to FIG. 14.

Figure 14:
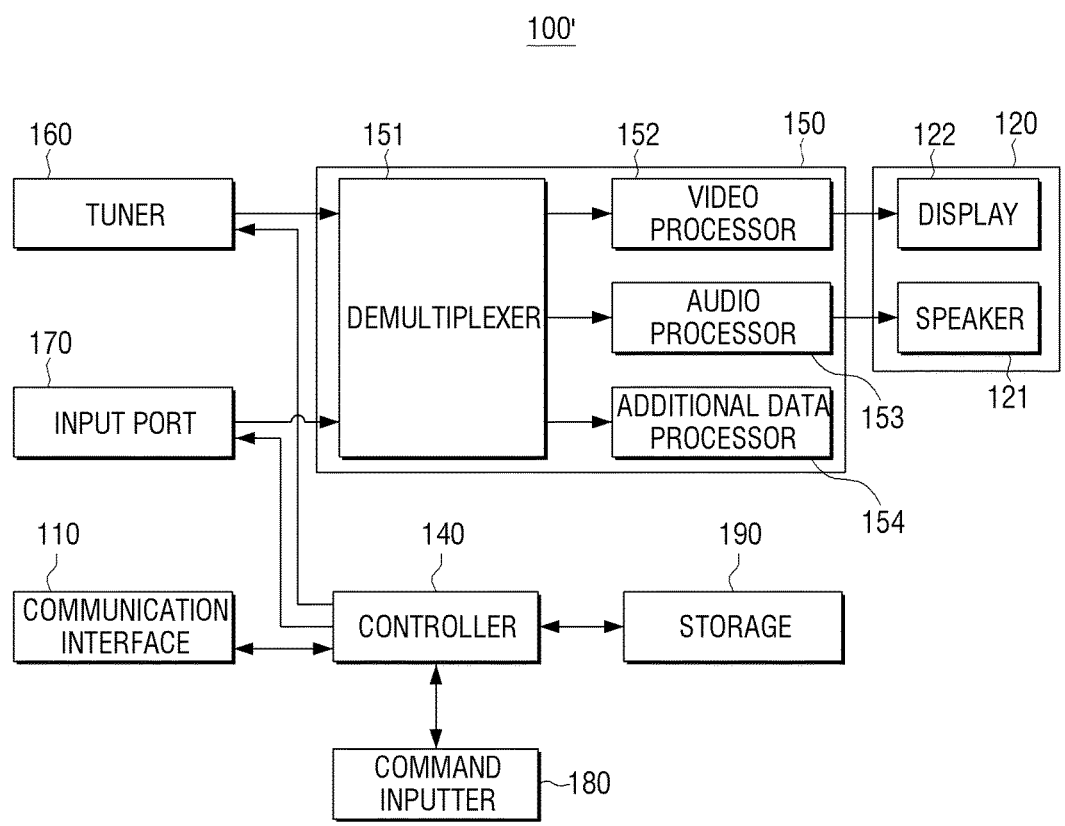
FIG. 14 is a block diagram for explaining a terminal device according to another exemplary embodiment.

Referring to FIG. 14, the terminal device 100' may include a tuner 160, an input port 170, a signal processor 50, an outputter 110, a communication interface 110, a storage 190, and a controller 140.

The tuner 160 may receive a broadcast signal for a channel selected by the user among a plurality of broadcast channels being received from a satellite receiving antenna, ground wave receiving antenna, and cable and the lie according to tuning control of the controller 140, and modulates the same.

The input port 170 may communicate with various external devices and receive contents. Examples of the input port 170 that may be used include a USB port, set top box port, and DVD port and the like.

The signal processor 150 may include a demultiplexer 151, a video processor 152, an audio processor 153, and an additional data processor 154. Meanwhile, the video processor 152 and audio processor 153 may correspond to the aforementioned fingerprint extractor 130.

The demultiplexer 151 may demultiplex the video data, audio data and additional data included in the content output through the tuner 160 or input port 170, and provide the same to the video processor 152, audio processor 153, and additional data processor 154.

The video processor 152 may decode the video data separated through the demultiplexer 151, and signal-process the decoded video data to have a perpendicular frequency, resolution, and screen ratio that fit the output standards of the display 122. The display 122 may output the video data being output from the video processor 152, and a user interface as an image.

Furthermore, the video processor 152 may scale the user interface that includes the object information received from the server 200 and the video data such that the user interface and the video data are displayed on the display 122 together and output the same. Furthermore, the video processor 152 may extract a fingerprint, that is a feature information from the video signal that forms the content.

The audio processor 153 may decode the audio data provided from the demultiplexer 121, and then signal-process the same such that it fits the output standards of the speaker 121. Furthermore, the audio processor 153 may extract the fingerprint, that is the feature information of the audio signal being input.

When additional information such as EPG and subtitles are included, the additional data processor 154 may process the additional data separated by the demultiplexer 151, and add the processed subtitles and the like to a corresponding image frame, The communication interface 110 may include various communication chips embedded therein, and thus may communicate with the server 200 in various communication methods, to be provided with various information.

The command inputter 180 may include various keys for receiving a user command, and an infrared receiver configured to receive a user command transmitted from a remote control apparatus. Otherwise, the command inputter 180 may be combined with the display 122 and may be realized in a touch panel method. The user command received through such a command inputter 180 may be converted into a corresponding key signal, and transmitted to the controller 140.

In the storage 190, various programs and data necessary for performing operations of the terminal device 100' may be stored. Furthermore, in the storage 190, the fingerprint of the video signal or audio signal extracted from the signal-processor 150, and the fingerprint received from the server 200, basic content information, and object information may bee stored.

Furthermore, the storage 190 may include an analyzing module for comparing and analyzing the fingerprint extracted from the signal-processor 150 and the fingerprint received from the server 200, and an event processing module for outputting the object information received from the server 200 and processing a user input regarding the object information.

The controller 140 may control each component of the terminal device 100'. Especially, the controller 140 may detect an object from a frame that forms a content, and transmit the fingerprint extracted from the frame from which the object is detected to the server 200.

According to another exemplary embodiment, the controller 140 may control the communication interface 110 to identify the content currently being output using the EPG included in the content, and to transmit the identified content information to the server 200. That is, hereinabove, only exemplary embodiments using a fingerprint were explained, but the identified information using the EPG may be used instead of the fingerprint.

Furthermore, the controller 140 receives the object information corresponding to the transmitted fingerprint or the identified information from the server 200. Furthermore, the controller 140 controls the outputter 120 to output the object information from the server 200 at a timing when the corresponding frame is output. The server 200 may transmit information on the object information outputting time together with the object information to the terminal device 100' so that the object information may be output when the frame where the corresponding object is included is output. Accordingly, the controller 140 may output the object information after a certain time passes from the point of receiving the object information according to the information on the object information output time received.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A terminal device comprising:
   a communication interface;
   a display; and
   a processor configured to:
      control the display to output a moving picture;
      extract fingerprints from frames of the moving picture while the moving picture is output;
      detect an object from a frame of the moving picture while the moving picture is output;
      control the communication interface to transmit, to a server, a request comprising a fingerprint extracted from a currently output frame, to query information corresponding to the fingerprint comprised in the request;
      in response to transmitting the request to the server, receive, from the server, the information corresponding to the fingerprint comprised in the transmitted request; and
      control the display to output the received information,
   wherein the processor is further configured to control the communication interface to regularly transmit the request to the server at a predetermined time interval while a target object is not detected,
   wherein the processor is further configured to control the communication interface to transmit the request to the server immediately when the target object is detected regardless of the predetermined time interval, and
   wherein the processor is further configured to stop transmitting the request to the server while the same target object is continuously detected.

2. The terminal device according to claim 1, wherein the information comprises at least one of biography information, music information, advertisement information, broadcast program information, and item information.

3. The terminal device according to claim 1, wherein the processor is further configured to control the communication interface to transmit the received information to an external device.

4. The terminal device according to claim 1, wherein the fingerprint is an identifier that is extracted from the frame and that enables the frame to be distinguished from other frames, and the frame corresponds to at least one of a video frame and an audio frame.

5. An information providing method of a terminal device, the method comprising:
   outputting a moving picture;
   extracting fingerprints from frames of the moving picture while the moving picture is output;
   detecting an object from a frame of the moving picture while the moving picture is output;
   transmitting, to a server, a request comprising a fingerprint extracted from a currently output frame, to query information corresponding to the fingerprint comprised in the request;
   in response to transmitting the request to the server, receiving, from the server, the information corresponding to the fingerprint comprised in the transmitted request; and
   outputting the received information,
   wherein the request is regularly transmitted to the server at a predetermined time interval while a target object is not detected,
   wherein the request is transmitted to the server immediately when the target object is detected regardless of the predetermined time interval, and
   wherein the information providing method further comprises: stopping the request from being transmitted to the server while the same target object is continuously detected.

6. The information providing method according to claim 5, wherein the information includes at least one of biography information, music information, broadcast program information, and item information.

7. The information providing method according to claim 5, further comprising transmitting the received information to an external device.

8. The information providing method according to claim 5, wherein the fingerprint is an identifier that is extracted from the frame and that enables the frame to be distinguished from other frames, and the frame corresponds to at least one of a video frame and an audio frame.

* * * * *